United States Patent

Rump

Patent Number: 5,975,648
Date of Patent: Nov. 2, 1999

[54] METHOD FOR PREVENTING A VEHICLE FROM BEING PARKED WITH AN ACTIVATED ROLL-AWAY PREVENTER AND UNACTIVATED PARKING BRAKE

[75] Inventor: Siegfried Rump, Weinstadt, Germany

[73] Assignee: DaimlerChrysler AG, Germany

[21] Appl. No.: 08/857,365

[22] Filed: May 15, 1997

[30] Foreign Application Priority Data

May 15, 1996 [DE] Germany ............................ 196 19 641

[51] Int. Cl.⁶ ........................... B60T 13/74; B60R 25/04; B60K 41/20
[52] U.S. Cl. ............................. 303/3; 307/10.3; 477/198; 180/271; 180/272; 303/15
[58] Field of Search ................................... 307/9.1, 10.1, 307/10.2, 10.3, 10.6; 180/271, 272, 287; 192/4 A; 477/93, 194, 197, 198, 203, 207, 210; 303/3, 15, 20

[56] References Cited

U.S. PATENT DOCUMENTS

| | | | |
|---|---|---|---|
| 3,937,295 | 2/1976 | Wright | 180/271 |
| 4,871,215 | 10/1989 | Takayawa | 303/100 |
| 4,878,205 | 10/1989 | Fontaine | 60/547.1 |
| 4,892,014 | 1/1990 | Movell et al. | 74/866 |
| 5,129,494 | 7/1992 | Roliuski et al. | 192/44 |
| 5,624,352 | 4/1997 | Swale | 477/197 |
| 5,670,831 | 9/1997 | Georgiades | 307/10.3 |

FOREIGN PATENT DOCUMENTS 36 21 076 A1 of 0000 Germany .

*Primary Examiner*—Chris Schwartz
*Attorney, Agent, or Firm*—Evenson, McKeown, Edwards & Lenahan, P.L.L.C.

[57] ABSTRACT

A motor vehicle is prevented from being parked with an unactivated parking brake. This vehicle has a roll-away preventer normally to apply a brake pressure which prevents the motor vehicle from rolling. To prevent unintentional rolling of the vehicle upon failure of the roll-away preventer, deactivation of the drive engine by using the ignition key is prevented when a brake pressure is not present to prevent the motor vehicle from rolling.

11 Claims, 4 Drawing Sheets

METHOD FOR PREVENTING A VEHICLE FROM BEING PARKED WITH AN ACTIVATED ROLL-AWAY PREVENTER AND UNACTIVATED PARKING BRAKE

BACKGROUND AND SUMMARY OF THE INVENTION

This application claims the priority of 196 19 641.8, the disclosure of which is expressly incorporated by reference herein.

The invention relates to a method for preventing a vehicle from being parked with an activated roll-away preventer and unactivated parking brake. The method is based on the principle whereby the vehicle is held in the stationary state even after the end of activation of the service brake by applying a brake pressure.

As described in DE 36 21 076 A, the vehicle is held in the stationary state by virtue of the fact that valves are closed, then preventing the wheel brake cylinders from venting into the brake-fluid reservoir vessel. To this end, the valves are controlled by a control unit. The control unit evaluates input signals to determine whether the driver desires to drive the vehicle or whether a further stationary state of the vehicle is desired. This evaluation is based upon the input signals fulfilling prescribed triggering criteria. A device which carries out such a method is referred to as a roll-away preventer.

To the same effect, U.S. Pat. No. 4,787,205 discloses that a brake pressure, which maintains the stationary state of the vehicle, can be applied by the driver to the wheel brake cylinders independently of the activation of the brake pedal by generating or maintaining, a pressure difference between the chambers of a brake booster or an auxiliary booster corresponding thereto.

A disadvantage of maintaining the brake pressure in the known manner is that the vehicle is held in the stationary state without a deliberate decision by the driver. If the driver now wishes to park the vehicle, i.e. shut off the drive engine and leave the vehicle, there is the risk of the driver not activating the parking brake of the vehicle, because the at least temporarily maintained brake pressure keeps the vehicle in the stationary state even without the parking brake being activated. In order to ensure that the parking brake is nevertheless activated, the aforementioned DE 36 21 076 A1 proposes a warning buzzer which reminds the driver to activate the parking brake when the roll-away preventer is activated. In addition, the power supply of the valves which maintain the brake pressure is proposed to be independent of the position of the ignition key, so that, even when the ignition is switched off, these valves are held in the closed state.

Even these measures have disadvantages, however, for example, the warning buzzer may be disregarded because the driver expects to park for only a brief, insignificant, time. If the parking duration becomes unexpectedly prolonged, the driver is no longer aware of the poorly secured state of the vehicle which may result in increased risk. In addition, the vehicle battery may be discharged as a result of the valves being closed for a long time, in particular when the batteries have a poor charge state. Therefore, despite these measures, the parked vehicle may roll away. Also, as a result of leakages or gradual reduction of the pressure difference between the chambers of the brake booster, when the roll-away preventer is activated for a long time the applied brake pressure may no longer reliably prevent the vehicle from rolling.

An object of the present invention is to prevent unintentional rolling of a vehicle equipped with a roll-away preventer which, as a result of system failure, permits a pressure drop in the activated roll-away preventer.

This object has been achieved in accordance with the present invention in a situation which, if a brake pressure which prevents the motor vehicle from rolling in wheel brake cylinders, and the parking brake is not activated, the method prevents deactivation of the drive engine by the ignition key, or if a brake pressure which prevents the motor vehicle from rolling is applied in the wheel brake cylinders and the parking brake is not activated, the method preventing the ignition key from being withdrawn by a blocking mechanism.

Alternatively, the method involves generating brake pressure which prevents the rolling, by the steps of generating a pressure difference between the chambers of a brake booster, and controlling the pressure difference by a brake booster valve configured to be switchable by the control device. Thereby, when duration of the period over which a brake pressure is applied exceeds a specific measure, the valve is activated and a maximum pressure difference between the chambers of the brake booster is built up to damage the valve to remain permanently in a preselected position.

The methods according to the basic concept of the present invention ensure that the vehicle is not parked with an activated roll-away preventer and unactivated parking brake.

According to one embodiment of the present invention, the drive engine is prevented from being deactivated. An advantage of this approach is that as a result of the operation of the vehicle engine an energy source is continuously available. As a result, it is ensured, for example in underpressure brake boosters, that the engine-side chamber is supplied with underpressure (intake manifold pressure) while the pedal-side chamber can be supplied with atmospheric pressure by activating a switching valve. With overpressure brake systems or overpressure brake boosters, pressure can be continuously generated during operation via the compressor which is driven by the vehicle engine. If the brake pressure which prevents the vehicle from rolling is applied by activating valves assigned to the wheel brakes, there is always sufficient current available for valve activation while the vehicle engine is operating. Thus, the operation of the drive engine provides a high degree of protection against failure. Moreover, the driver will not park his vehicle as long as its drive engine is operating.

According to the present invention, the deactivation of the drive engine with an activated roll-away preventer and non-activated parking brake is prevented by virtue of the fact that a blocking mechanism prevents the key from being activated beyond a specific position. The key is initially in the operating position of the drive engine. A blocking mechanism then prevents the ignition key from being activated into a position (radio position or key withdrawal position) in which the drive engine of the vehicle is switched off.

According to another embodiment, the key is not prevented from being activated, but rather the activation function, namely the deactivation of the drive engine, is suppressed and the engine continues to operate. It is also contemplated that, in addition, a blocking mechanism prevents the key from being withdrawn from the ignition lock.

According to yet another embodiment, the deactivation of the vehicle is prevented by not allowing the key to be withdrawn from the ignition lock by way of a blocking mechanism for as long as the roll-away preventer is activated and the parking brake is not activated. Because a driver does not customarily leave the vehicle as long as the ignition key has not been withdrawn from the ignition, lock, this blocking mechanism prevents the driver from leaving the vehicle when it is in a state not reliably protected against rolling away.

According to still another embodiment, a previously mentioned procedure is particularly advantageous if the brake pressure preventing the rolling of the vehicle is applied and generates a pressure difference between the chambers of a brake booster. In conventional brake boosters, this pressure difference decreases gradually when the vehicle engine is switched off, creating a particularly large risk for the vehicle if it is parked without the parking brake being activated. Such risk is avoided with the present invention.

According to another aspect of the present invention, a roll-away preventer applies the brake pressure which prevents the vehicle from rolling by a pressure difference generated between the chambers of a brake booster independently of the activation of the brake pedal by the driver by a brake booster valve which can be switched by the control device, after a specific activation period has been exceeded, in the position which corresponds to an application of a maximum brake pressure. Then the valve is damaged to such an extent that it remains in this maximum brake pressure application position and therefore assumes this position permanently even without the valve being actuated.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
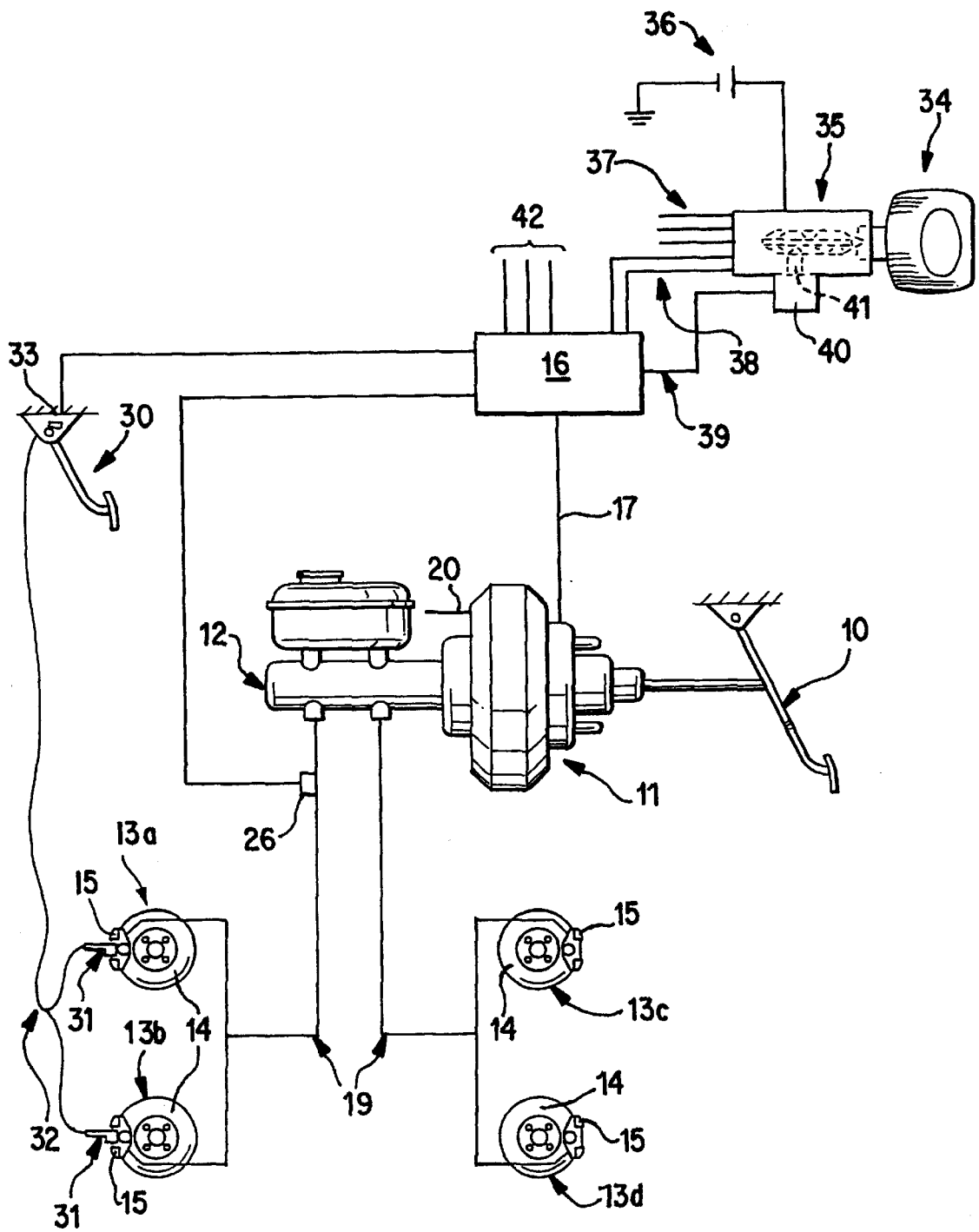
FIG. 1 is a schematic drawing of a vehicle brake system for carrying out a method according to the present invention.

In FIG. 1, wheel brakes 13a, 13b, 13c, 13d are each comprised of a brake disc 14 and a brake caliper 15 which contain the wheel brake cylinder. The brake lines 19 connect the brakes to the master brake cylinder 12. When required, the brake pressure can be measured at one of the brake lines 19, for example by a pressure sensor 26, and can be passed onto the control unit 16.

The parking brake is illustrated as a foot-activated brake device and, apart from the method of its activation, does not differ from a conventional manually-activated parking brake. Activation devices 31 are arranged on the brake calipers 15 and permit the brake linings to be applied to the brake disc 14. The force necessary for this activation is transmitted by the Bowden cable 32 from a parking brake pedal 30 to the activation device 31. A sensor 33 senses the position of the parking brake pedal 30 and passes on an appropriate signal to the control unit 16.

The master brake cylinder 12 is attached to the brake booster 11. The brake booster 11 is in the illustrated exemplary embodiment configured as an underpressure brake booster and is connected via the line 20 to the intake manifold which is used as an underpressure source. The brake pedal 10 is mechanically connected to the brake booster 11. Via the control line 17, the control unit 16 is connected to a control valve in the brake booster 11 which permits a pressure difference between the chambers of the brake booster 11 to be built up independently of the activation of the brake pedal 10 by the driver. The actuation of the control valve takes place if it is concluded from the further signals 42 fed to the control unit 16 that the triggering criterion for the application of a brake pressure which prevents the vehicle from rolling is fulfilled.

Furthermore, the control unit 16 is connected to the ignition lock 35 via lines 38 such that the position of the ignition key 34 is sensed by the control unit 16. The ignition lock 35 is activated by the ignition key 34 and is connected to the vehicle battery 36 to switch the electrical connection between the vehicle battery 36 and the power supply 37 of a multiplicity of loads. The schematically illustrated blocking mechanism 40 with the blocking latch 41, actuated by the control device 16 by way of the control line 39, prevents the ignition lock 35 from being activated or prevents the ignition key 34 from being withdrawn from the ignition lock 35.

Figure 2:
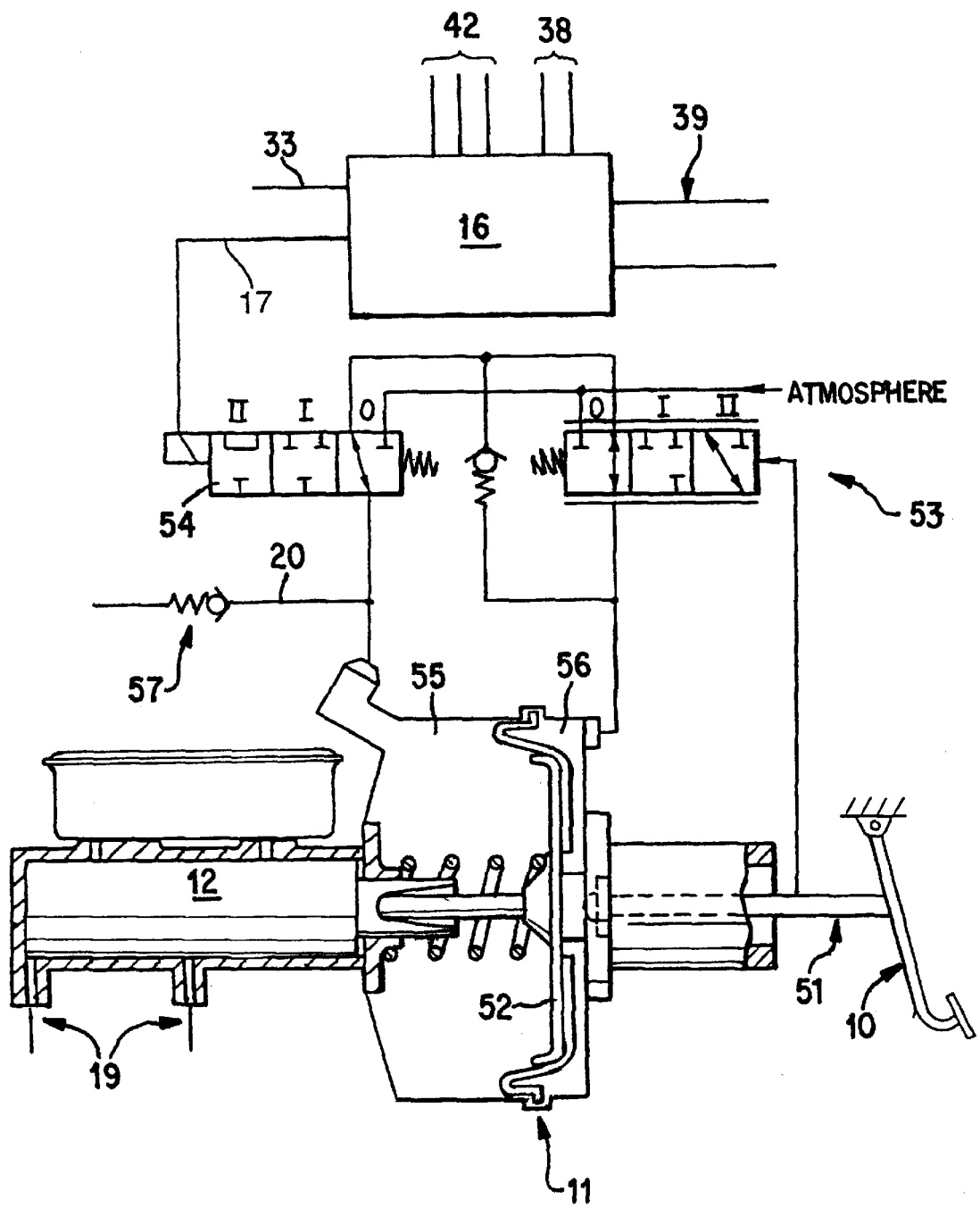
FIG. 2 is a schematic diagram of a brake booster, particularly configured for generating a brake pressure independently of the activation of the brake pedal by the driver.

In FIG. 2, the switching valves are not in their arrangement on the brake booster, but instead, in order to clarify the possible switching states, are shown outside the brake booster as switching symbols. The brake pedal 10 is supported on the working pistons 52 of the brake booster 11 by the brake linkage 51. The working piston 52 separates the two chambers 55, 56 of the brake booster 11 from one another. The piston of the master brake cylinder 12 is supported on the other side of the working piston 52. The line 20 connects the brake cylinder-side chamber 55 to the underpressure source, usually therefore to the intake manifold of an engine. The brake pedal-side chamber 56 is fluidically connected to the chamber 55 in the unactivated position of the valve 54 which can be actuated by the control unit 16 via the control line 17, and when the switching valve 53 is unactivated. As a result, the chamber 56 is vented into the chamber 55.

When the brake pedal 10 is activated, the switching valve 53 is initially switched, as a function of the activation force, from the position of rest 0 into the position I in which the two chambers 55, 56 are fluidically separated from one another. Then, the switching valve is switched into position II so that the chamber 56 is fluidically connected to the atmosphere. As a result, a pressure difference between the chambers 55 and 56 is produced. If the brake pedal is held with constant activation force, the switching valve 53 assumes the position I again after an appropriate pressure difference between the chambers has been achieved. If the brake pedal is released or the activation force reduced, the valve assumes the position of rest 0.

The valve 54 can be switched by the control unit 16 counter to the switching valve 53 which switches by virtue of the forces acting on the brake pedal. The valve 54 can assume each of its three switched positions independently of the activation of the brake pedal. Here, the switching is configured such that the switched state of the valve 54 dominates that of the switching valve 53, so that when the two valves 53, 54 are activated, the switched state of the valve 54, if it is activated, is set. The switched state of the switching valve 54 is only active if the valve 54 is in the unactivated state 0. In the switched state 0 of the valve 54, the instantaneous switched state results from the position of the switching valve 53. In the switched state I of the valve 54, the fluidic connection both from the chamber 56 to the ventilator (atmosphere) and to the venting area (chamber 55) are blocked. A pressure difference present between the two chambers 55, 56 is maintained independently of the activation of the brake pedal 10. In the switched position II of the valve 54, a pressure difference is built up between the chambers 55 and 56 in that the chamber 56 is fluidically connected to the atmosphere. The magnitude of the pressure difference depends on the duration of the period over which the position II of the valve 54 is maintained until the maximum pressure difference is reached.

Thereby, if the triggering criterion, which can also consist in checking a plurality of states in different logic connections, is fulfilled, the control unit 16 can build up a pressure difference between the chambers 55, 56 of the brake booster 11 by switching the valve 54. The master brake cylinder 12 then generates a brake pressure in the brake lines 19 and, consequently, also in the wheel brakes 13a, 13b, 13c, 13d to hold the vehicle stationary. The non-return valve 57 ensures that when, for example, the drive engine is switched off, the chamber 55 cannot be ventilated via the line 20 and lead to an unintentional decrease in the pressure difference between the chambers 55, 56.

In order to generate permanently a maximum pressure difference between the two chambers 55, 56 independently of the power supply, if the duration of the period over which a brake pressure is applied exceeds a specific measure, e.g. values of at least 15 minutes, the valve 54 is activated in such a way that it goes into the ventilation position II. In this position, the valve 54 is damaged in such a way that it remains in the position II even if appropriate actuation of the valve 54 by the control unit 16 does not take place. This ensures that the parked vehicle does not unintentionally roll away even if the supply voltage collapses. The damage to the valve 54 has the disadvantageous result that the brake is always activated to a maximum degree and it is therefore not possible to drive the vehicle, but this disadvantage can be tolerated in view of the less desirable hazard presented by a driverless rolling vehicle.

Figure 3:
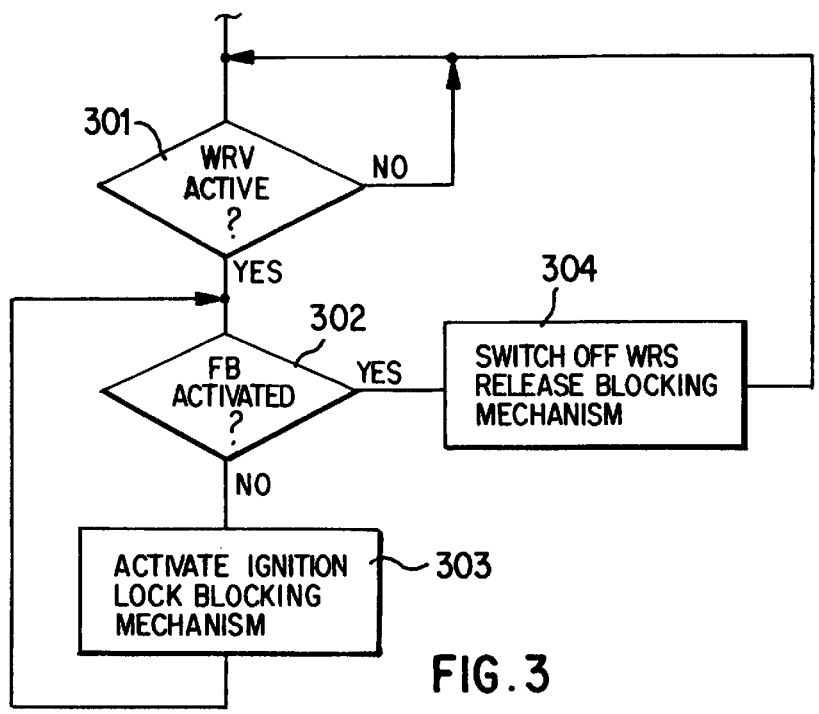
FIG. 3 is a flowchart of a first method for preventing a vehicle from being parked with an unactivated parking brake by way of a blocking mechanism in the ignition lock.

In step 301 of FIG. 3, the system checks whether the roll-away preventer WRV is activated, i.e. whether a brake pressure preventing the vehicle from rolling has been generated in wheel brake cylinders independently of the activation of the brake pedal by the driver. As soon as this activation occurs, it is checked in step 302 whether the parking brake FB of the vehicle has been activated. If this is the case, in step 304 the roll-away preventer WRV is deactivated, that is to say the generated brake pressure is reduced. After the reduction of brake pressure has been terminated, the vehicle is thus kept in the braked and stationary state only by way of the parking brake. The termination of the activation of the roll-away preventer which takes place directly after the activation of the parking brake advantageously permits the driver to determine immediately whether the activation of the parking brake which has taken place is sufficient to keep the vehicle in the stationary state. A blocking mechanism 40 which possibly engages on the ignition lock or on the ignition key is triggered. Then, the system jumps to step 301. If, on the other hand, the parking brake is not activated, according to step 303 a blocking mechanism 40 which acts on the ignition lock or ignition key is activated or its activation is continued. By way of the blocking mechanism, the ignition key 34 can be prevented, for example, from being withdrawn from the ignition lock 35 or the ignition key can be prevented from being activated beyond a specific position.

Ignition locks usually have four positions 0, 1, 2 and 3. It is possible to withdraw the ignition key only in the position 0, and the steering is blocked after the engagement. In position 1, also referred to as radio position, the blocking mechanism of the steering is released and most of the current loads (e.g., radio) are switched on. The position 2 (ignition on) is the driving position and the position 3 is the starting position for activating the starter.

It can be assumed that, at the time when the roll-away preventer is activated, the ignition key is in position 2 (the driving position) and that the engine of the vehicle is operating. With a blocking mechanism which prevents the activation of the ignition key, the ignition key can then be blocked in the position 2 in accordance with step 303; activation of the key in the direction of the position 1 is prohibited and the drive engine cannot then be switched off. As a result, the driver is prevented from parking his vehicle without the parking brake being activated.

According to a further embodiment of the invention, the activation of the key in position 1 only is prohibited. Then, although the drive engine can be switched off, most of the electrical loads are switched on. It is, however, not possible to withdraw the ignition key in this position so that the vehicle cannot be parked in this state. Furthermore, the control unit 16 continues to be energized in this state.

Figure 4:
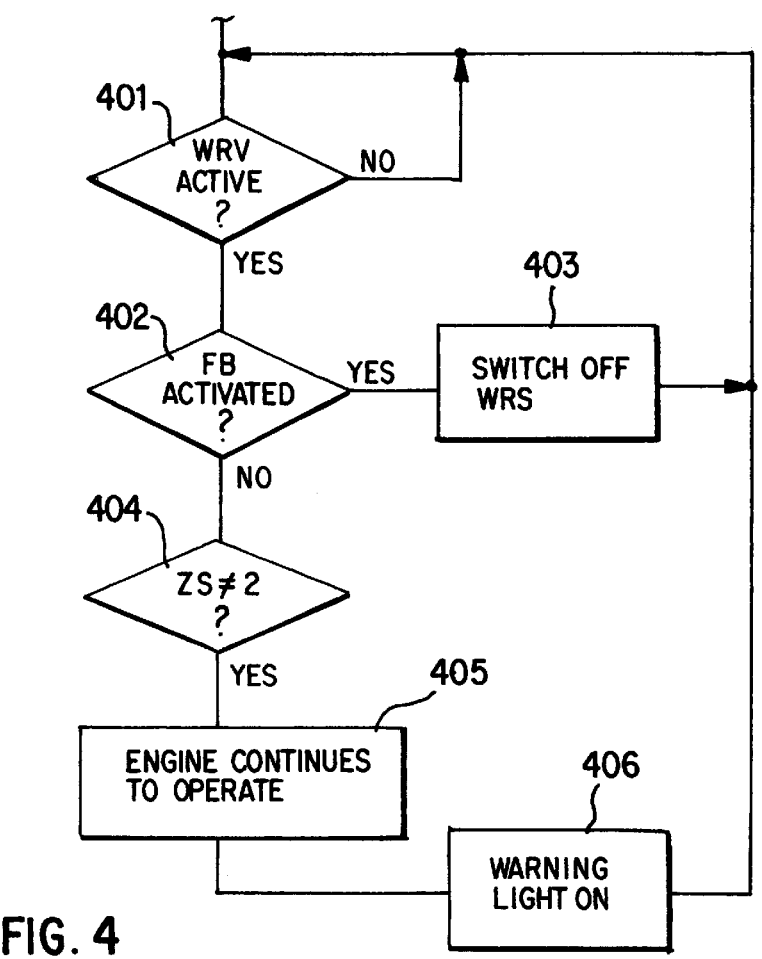
FIG. 4 is a flowchart of a second method for preventing a vehicle from being parked with an unactivated parking brake.

In the flowchart of FIG. 4 showing a further embodiment of a method according to the invention, Steps 401, 402 of this method are identical to the respective steps 301, 302 of the method described above. If in step 402 the parking brake FB is detected as being activated, the roll-away preventer is deactivated in step 403, that is to say the brake pressure generated in the wheel brakes independently of the activation of the brake pedal by the driver is reduced. Simultaneously, the warning device (visual or audible indicator) is switched off. If a blocking mechanism should prevent the key from being withdrawn, this blocking mechanism is released.

Otherwise, the system jumps from step 402 to step 404 in which it is checked whether the ignition key is in the position 2. If so, the vehicle is judged as not being parked and the system jumps back to step 401. If not, the system jumps from step 404 to step 405. The ignition key is no longer in the position 2 and it is therefore activated by the driver. Such an activation corresponds either to the driver's intention to switch off the vehicle engine or else to reactivate the vehicle engine after it stalls. In both cases it is desirable if the driver firstly activates the parking brake. Therefore, although, according to this method, the ignition key can be appropriately reactivated, this does not lead to the vehicle engine being switched off or starting and the vehicle engine continues to be operated, under the control of the control unit 16, as if the ignition key was still in the position 2. In this procedure, it is also useful if, in addition, a blocking mechanism prevents the key from being withdrawn from the ignition lock. The operation of the drive unit has the advantage that the drive engine continues to be available as an underpressure source and power source.

Then, the driver is additionally informed according to step 406 with visually and/or audibly, i.e., for example, a warning light and/or warning buzzer, that it is not possible to park the vehicle in this state. The system then jumps to step 401.

Figure 5:
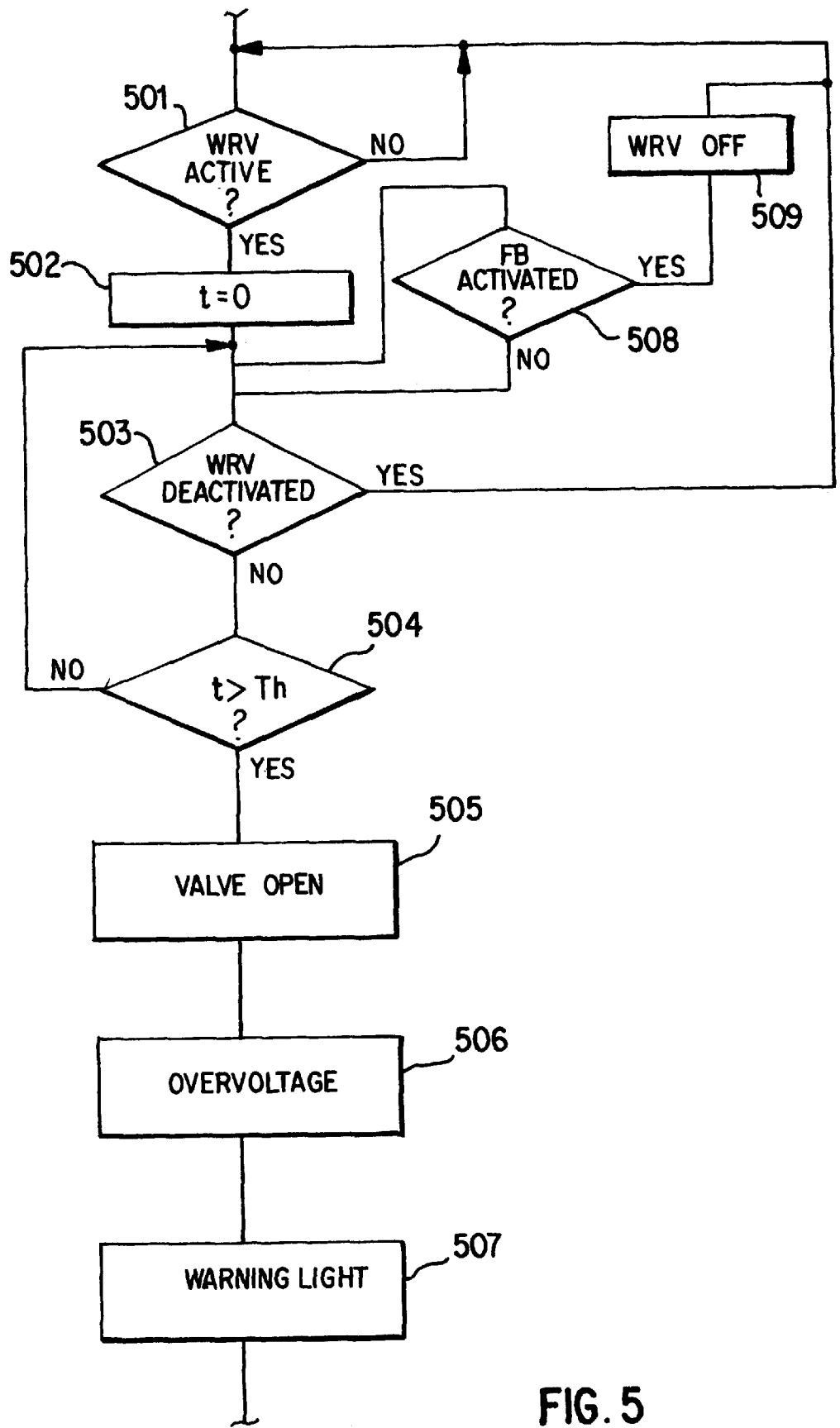
FIG. 5 is a flowchart for permanently generating a brake pressure which maintains the stationary state of the vehicle.

FIG. 5 is an alternative embodiment of the method according to the present invention in which a braking force is applied for as long as possible independently of the supply to the control unit or to the underpressure brake booster. The method relates to roll-away preventers whose braking force is provided by application of a pressure difference between the chambers of a brake booster. This approach assumes that, if the roll-away preventer WRV is activated beyond a specific time, the vehicle is parked. If this parking takes place without the parking brake FB being activated, there is basically the risk of the vehicle rolling unintentionally. Therefore, in step 501, a check is made to determine whether the roll-away preventer WRV is activated; if so, a timer is activated in step 502. In step 508, a test determines whether the parking brake FB is activated; if so, in step 509 the roll-away preventer and means which may be present are deactivated in order to warn the driver, and the system then jumps back to step 501.

If it has been detected in step 508 that the parking brake FB is not activated, a test in step 504 determines whether the timer t has exceeded the maximum holding time Th. If not, the system jumps back to step 508. Otherwise, in step 505 the control unit 16 actuates the valve 54 to the position II and therefore a maximum pressure difference is generated between the chambers of the brake booster. Thus, maximum possible brake pressure is applied to the brakes 13*a*, 13*b*, 13*c*, 13*d*. Then, as a result of a brief overvoltage of a brief current lying above the rated power, damage is produced in the switching relay 60 of the valve 54. This damage leads to the valve 54 remaining permanently in the position II without further activation. Then, according to step 507 a warning device is activated which, at least when the ignition key is not in the position 0, informs the driver that the brake system is no longer operating satisfactorily. Actually, after the damage to the valve 54, the driver continuously carries out full braking in the position provided, and therefore the valve 54 must be replaced before this vehicle is operated again. The warning device is, for example, an appropriate warning lamp or a warning buzzer. Of course, it is also possible to actuate a warning buzzer and warning lamp simultaneously.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method for preventing a motor vehicles which has a drive engine with an operating state determined by a position of an ignition lock activatable with an ignition key, from being parked with a roll-away preventer activatable by generating a brake pressure in wheel brake cylinders, via a control unit as a function of a triggering criterion and an unactivated parking brake, to prevent the motor vehicle from rolling, comprising the steps of sensing activation of the parking brake, applying in the wheel brake cylinders the brake pressure which prevents the motor vehicle from rolling, and, when the parking brake is not activated, preventing deactivation of the drive engine by the ignition key.

2. The method according to claim 1, wherein the step of preventing deactivation of the drive engine is effected by a blocking mechanism preventing the ignition key from being activated beyond a specific position of the ignition lock.

3. The method according to claim 2, wherein the specific position is an operating position of the ignition lock in which the vehicle drive engine is operating.

4. The method according to claim 1, wherein, in order to carry out the step of preventing the deactivation of the drive engine, a blocking mechanism is moved into an active position in which the deactivation of the drive engine does not occur even when the ignition key is appropriately activated.

5. The method according to claim 4, wherein the blocking mechanism prevents the ignition key from being withdrawn from the ignition lock.

6. The method according to claim 1, wherein the brake pressure in the wheel brake cylinders is generated by a pressure difference between chambers of a brake booster.

7. Method according to claim 1, further comprising, when a brake pressure which prevents the vehicle from rolling is applied and the ignition key is activated in the sense of deactivation of the drive engine or the withdrawal of the ignition key from the ignition lock, the step of indicating to the driver by at least one of visually and audibly that the vehicle is not reliably parkable.

8. A method for preventing a motor vehicle which has a drive engine with an operating state determined by a position of an ignition lock which can be activated with an ignition key, from being parked with a roll-away preventer activatable by generating a brake pressure, which prevents the motor vehicle from rolling, in wheel brake cylinders via a control unit as a function of a triggering criterion and unactivated parking brake, comprising the steps of sensing activation of a parking brake and, when a brake pressure which prevents the motor vehicle from rolling is applied in the wheel brake cylinders and the parking brake is not activated, preventing the ignition key from being withdrawn by a blocking mechanism.

9. The method according to claim 8, wherein the step of preventing the ignition key from being withdrawn from the ignition lock by the blocking mechanism comprises blocking the ignition lock in a radio position.

10. Method for preventing a motor vehicle from rolling away, comprising the steps of generating a brake pressure, which prevents the motor vehicle from rolling, in wheel brake cylinders via a control unit as a function of a triggering criterion, and sensing the position of a parking brake, wherein the step of generating the brake pressure comprises the further steps of generating a pressure difference between the chambers of a brake booster, controlling the pressure difference via a brake booster valve configured to be switchable by the control device, and, when duration of the period over which a brake pressure is applied exceeds a specific measure, activating the valve to build up a maximum pressure difference between the chambers of the brake booster to damage the valve which then remains permanently in a preselected position.

11. Method according to claim 10, wherein damage to the valve is indicated to the driver at least by at least one of visually and audibly when the ignition lock is in a position other than a rest position in which the ignition key is withdrawable.

* * * * *